United States Patent [19]

Gaglione et al.

[11] Patent Number: 4,532,518

[45] Date of Patent: Jul. 30, 1985

[54] METHOD AND APPARATUS FOR ACCURATELY SETTING PHASE SHIFTERS TO COMMANDED VALUES

[75] Inventors: Stanley Gaglione, New Hyde Park; John J. Stangel, Mahopac, both of N.Y.

[73] Assignee: Sperry Corporation, New York, N.Y.

[21] Appl. No.: 415,504

[22] Filed: Sep. 7, 1982

[51] Int. Cl.[3] .......................... H04B 7/08; H01Q 3/36

[52] U.S. Cl. ................................ 343/372; 333/17 R; 343/703; 343/778

[58] Field of Search ..................... 333/17 R, 139, 164; 343/368, 371, 372, 778, 369, 703

[56] References Cited

U.S. PATENT DOCUMENTS 3,646,558 2/1972 Campanella ......................... 343/372
3,699,584 10/1972 Hrivnak et al. ..................... 343/768
4,302,738 11/1981 Cabot et al. ........................ 333/174
4,373,160 2/1983 Cooper ................................ 343/372

*Primary Examiner*—Eli Lieberman
*Attorney, Agent, or Firm*—Howard P. Terry; Seymour Levine

[57] ABSTRACT

An amplitude control circuit and variable phase shifter driver, employable in electronically steerable antennas, compares amplitude and phase command signals for the amplitude controller and phase shifter with command signals derived from the amplitude ratio and phase difference between a reference r.f. signal and an r.f. signal at a selected location. The difference signals resulting from this comparison are added to the amplitude and phase shift command signals and applied to the amplitude controller phase shifter drivers to adjust the amplitude controller and phase shifter.

6 Claims, 5 Drawing Figures

METHOD AND APPARATUS FOR ACCURATELY SETTING PHASE SHIFTERS TO COMMANDED VALUES

BACKGROUND OF THE INVENTION

1. Field of the Invention

The invention pertains to the field of electronically controlled phase shifters and more particularly to accurately setting such phase shifters to commanded values.

2. Description of the Prior Art

Applications exist for electronically steerable antennas that require extremely low sidelobes, as for example, −50 dB with respect to the main beam peak. To realize such low sidelobe levels, phase errors across the aperture for each scan beam must not exceed 0.5° RMS. Manufacture of an electronically scannable antenna to such type tight tolerances, even if feasible, would be extremely expensive. Calibration techniques, such as that disclosed by Herper et al in U.S. Pat. No. 4,270,129, issued in May 1981 and assigned to the assignee of the present invention, do not account for component variations due to aging and environmental conditions, requiring a repetition of the calibration procedure periodically, or as the environmental conditions dictate, in order to maintain the desired sidelobe levels. What is required is an automatic phase correction system capable of maintaining the required phase distribution for each scan angle of the antenna within the required tolerance limits to achieve the desired sidelobe levels.

SUMMARY OF THE INVENTION

In accordance with the principles of the present invention, a signal coupled to the input terminals of a variable phase shifter emerges therefrom phase shifted through a predetermined angle within relatively tight error limit. In one embodiment samples of the input signal to the phase shifter and the output signal therefrom are coupled to a phase comparator wherefrom a signal representative of the phase difference between the input and emerging signals is coupled to a comparator and compared with a phase command signal that is representative of the phase shift desired. The output signal from the comparator may be amplified in a driver circuit and coupled therefrom to the control terminals of the phase shifter as the phase shift control signal. Extremely accurate phase shift settings and phase error corrections may be obtained with a properly calibrated stable phase comparator.

In another embodiment of the invention, compensation for phase shift errors arising in networks preceding the variable phase shifter is realized by determining the phase variation between the signals at the input terminals of the network and the signals emerging therefrom, generating a signal representative of this phase shift error in phase command signal format, determining the difference between this phase representative signal and the phase command signal to form an error signal, and adding this error signal to the phase command signal prior to coupling a command signal to the driver circuit, wherefrom a driving signal is applied to set the variable phase shifter. This embodiment may be employed for antenna systems wherein a plurality of variable phase shifter/antenna element combinations are parallelly coupled to an output port of a distribution network to operate at equal phase settings. If a sufficient number of phase shifter/antenna element combinations are employed, phase shifter errors, for each nominal phase setting, tend to cancel and only phase shift errors encountered in the distribution network need be corrected.

Another embodiment of the invention, for antenna applications, employs an amplitude control element coupled between a distribution network and an antenna element. The ratio of the output signal of this amplitude control element to the input signal to the distribution network is formed and a signal representative thereof, in amplitude command signal format, is compared with the amplitude command signal to derive a signal representative of the difference therebetween. This difference representative signal is added to the amplitude command signal to form a control signal that is coupled to set the amplitude control element.

DESCRIPTION OF THE PREFERRED EMBODIMENT

Figure 1:
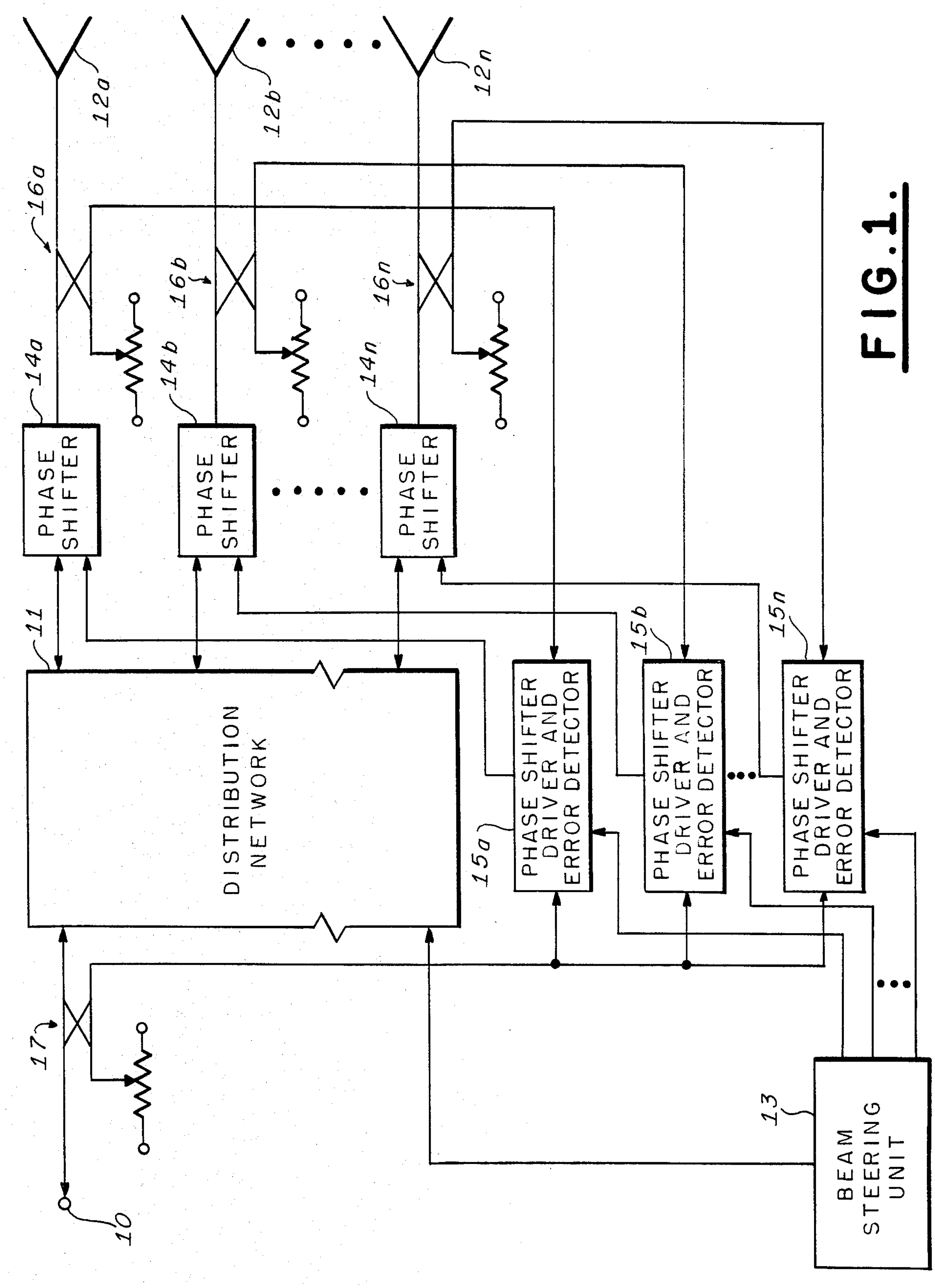
FIG. 1 is a block diagram of an embodiment of the invention.

Referring now to the antenna system block diagram of FIG. 1, a signal from a transmitter (not shown) may be coupled to the input terminal 10 of a distribution network 11 wherefrom the signal coupled to input port 10 is distributed to the antenna elements 12*a* through 12*n* in accordance with the distribution function programmed from a beam steering unit 13. Phase shifters 14*a* through 14*n* are interposed between each antenna element 12*a* through 12*n* and the corresponding output port of the distribution network 11. For each selected beam position the phase shifters 14*a* through 14*n* are set at a value, by the phase drivers 15*a* through 15*n* on command from the beam steering unit 13, to establish a phase gradient across the antenna elements 12*a* through 12*n* that is unique for the selected beam position. The signals from the driver circuits are in accordance with a phase shift versus driver signal calibration to establish an error free phase gradient. Environmental conditions, which alter the phase shift-driver voltage functionality, phase shift errors in the distribution network 11, and other unknown phase shift errors cause the phase gradient across the antenna elements 12*a* through 12*n* to deviate from the ideal. These phase errors may be minimized by detecting the phase shift deviation from the desired phase shift at each element and altering the driver signals to the phase shifter in accordance therewith.

To accomplish this, directional couplers 16*a* through 16*n* are positioned between phase shifters 14*a* through 14*n* and the antenna elements 12*a* through 12*n* extract a signal sample from each phase shifter to be compared with a signal sample extracted by a directional coupler 17 from the signal coupled to the distribution network 11 from the input port 10. The sampled signals from the directional couplers 16*a* through 16*n* are each coupled to corresponding phase shifter driver and error detectors 15*a* through 15*n* and compared therein with the signal sample coupled to each phase shifter driver and error detector from the directional coupler 17. The detected phase differences in each unit are associated with a phase command signal that is consistent with the phase command signal-phase shift setting for error free operation. Phase command signals generated by this association are compared with phase command signals from the beam steering unit 13 and detected error signals are added to phase command signals from the beam steering unit to provide modified phase command signals to drive the phase shifters. By making the phase comparisons between the input signal to the distribution network and the output signals from the phase shifters, all phase errors in the system are included in the compensation scheme and the resulting phase distribution across the antenna elements 12*a* through 12*n* is substantially error free.

Figure 2:
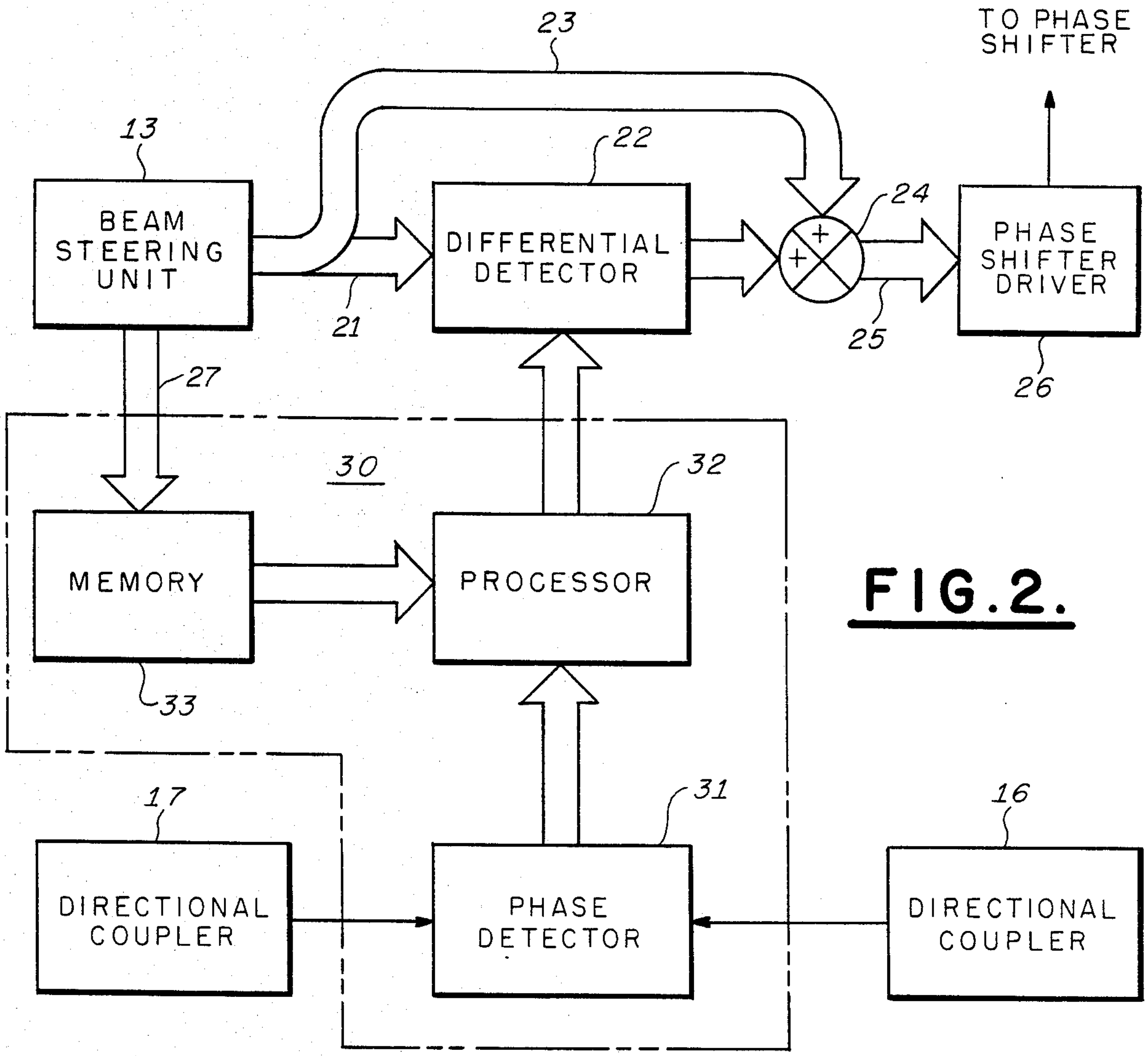
FIG. 2 is a block diagram of a driver and error detector that may be employed in the system of FIG. 1.

A more detailed description of the phase shift control loop will now be given with reference to FIG. 2. A phase command signal from the beam steering unit is coupled via line 21 to a differential detector 22 and via line 23 to a summing circuit 24, to which the differential detector 22 is also coupled. In the absence of the signal from the differential detector 22, the output signal from summing network 24, which is coupled via line 25 to the phase shift driver 26, is just the phase command signal from the beam steering unit 13. The phase shifter for the loop being described, not shown in FIG. 2, is driven by the signal at the output terminal of the summing network 24 to provide a phase shift to a signal incident thereto in accordance with the beam position selected. Directional coupler 16, coupled to the output port of the phase shifter under consideration, couples a sample of the output signal therefrom to a phase detector 31 in phase comparator 30. Also coupled to the phase detector 31 is the sample of the input signal from directional coupler 17. Signals representative of the phase difference between the sample signals are coupled from phase detector 31 to processor 32 wherein the representative signals are converted to a digital code unique to the phase difference between the sample signals. In one preferred embodiment phase detector 31 may be a six port phase detector, such as that described by Cronson et al in a paper entitled "A Six Port Automatic Analyzer" that appeared in the IEEE Transactions MTT, Vol. MTT-25, December 1977. This phase detector provides four output analog signals from which the phase difference between the two input signals may be determined.

Figure 3:
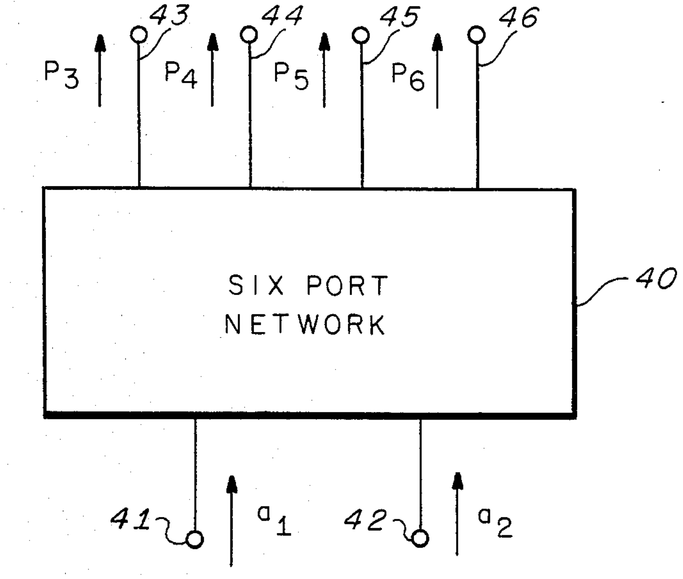
FIG. 3 is a diagram of a phase detector that may be employed in the phase comparator of FIG. 2.

Refer now to FIG. 3, the relationship between the input signals $a_1$ and $a_2$ to the six port network 40 at ports 41 and 42, respectively, and the output power $P_3$, $P_4$, $P_5$, and $P_6$ from the six port network 40 at 43, 44, 45, and 46, respectively, may be given by the matrix equation:

$$\begin{bmatrix} |a_1|^2 \\ Re\,(a_1a_2^*) \\ Im\,(a_1a_2^*) \\ |a_2|^2 \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix} \begin{bmatrix} P_3 \\ P_4 \\ P_5 \\ P_6 \end{bmatrix}$$

Thus, tan $\phi$, where $\phi$ is the phase angle between the signals $a_1$, and $a_2$, may be determined from the ratio of two polynomials:

$$\tan\phi = \frac{\sum_{j=1}^{4} C_{3j}P_{j+2}}{\sum_{j=1}^{4} C_{2j}P_{j+2}}$$

Processor 32 utilizes this equation to provide a digital signal that is representative of the phase angle $\phi$.

Quadrant ambiguities and the tangent are resolved from the sign of the numerator and denominator prior to division.

Processor 32 is coupled to memory 33. Memory 33 may store the 2×4 coefficient matrix:

$$\begin{bmatrix} C_{21} & C_{22} & C_{23} & C_{24} \\ C_{31} & C_{32} & C_{33} & C_{34} \end{bmatrix}$$

used by processor 32 in the above phase computation. These coefficients are obtained by calibrating the antenna, at selected frequencies in the operating band, either at the factory or in the field, and are stored as a function of frequency over the operating band of the antenna. The proper set of coefficients for a given computation is designated by a frequency code sent to memory 33 from the beam steering unit 13 through line 27. Output signals of processor 32 are digitally coded numbers representative of the signal phase at coupler 16 relative to the signal phase of a reference signal sampled through coupler 17. The digitally coded number from the processor 32 is coupled to differential detector 22 wherein it is compared with the signal from the beam steering unit and the difference therebetween is added to the signal from the beam steering unit in the summation unit 24. Sum signals from the summation unit 24 are coupled to the phase shifter driver 26, which in turn couples a command signal to the phase shifter thereby providing a trimming action that compensates for system phase errors and environmental phase variations. This compensation process may be implemented with open or closed loop systems. Open loop implementation requires no further processing, the antenna would now be ready for "error-free" operation. Closed loop implementation continues the process until the signal coupled from the differential detector 22 to the summation network 24 is substantially equal to zero.

Though the phase error compensation system above described utilizes the information carrying signal generated by the transmitter for system operation, it will be recognized by those skilled in the art that a special CW or pulsed signal injected at the system input terminals at appropriate times, as for example, prior to each transmission, could be utilized for system alignment.

Figure 4:
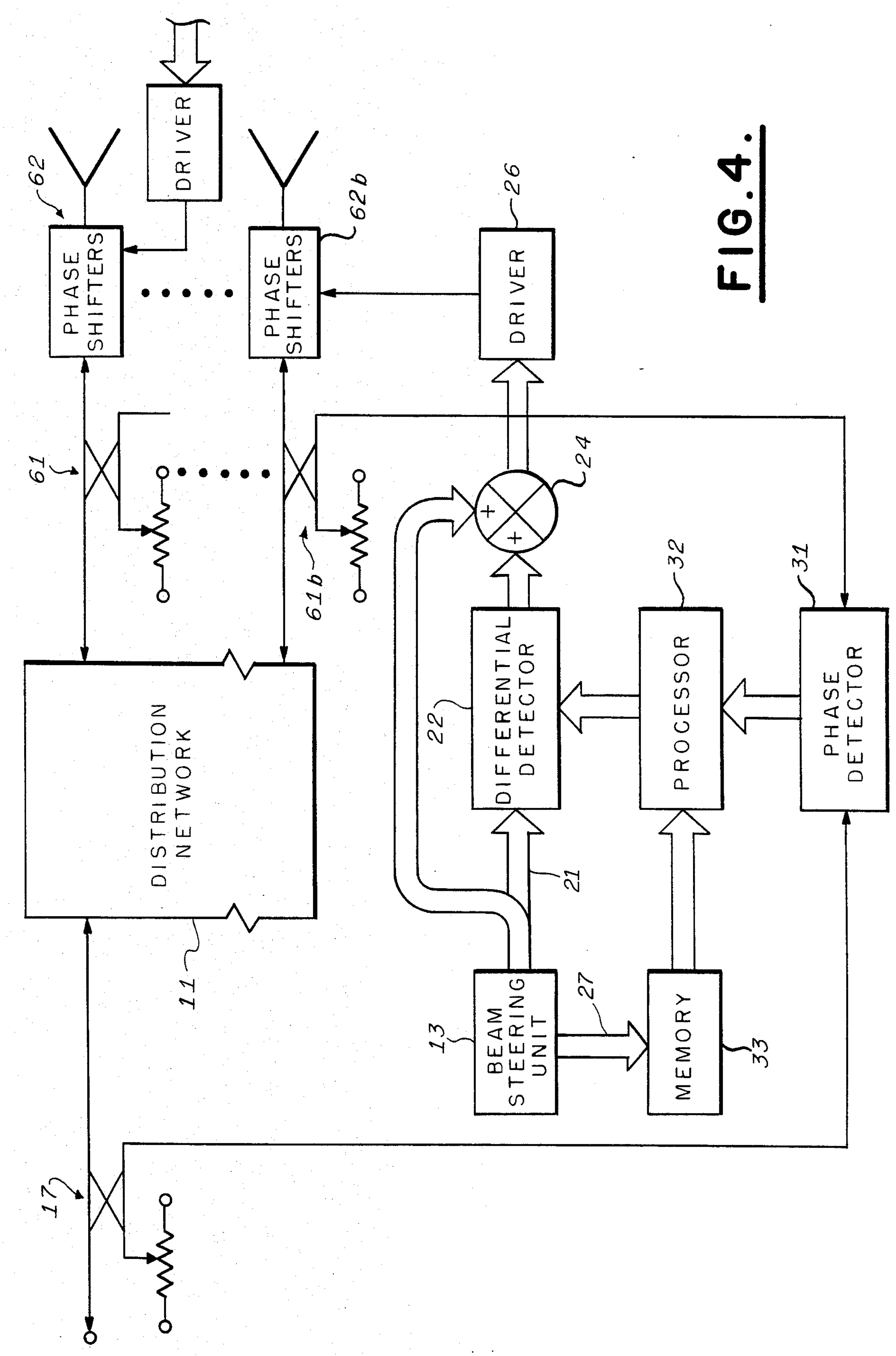
FIG. 4 is a block diagram of another embodiment of the invention.

Many array antenna configurations employ a multiplicity of antenna elements equally phased in the array, as for example, a column of elements in a two dimensional array for beam forming in the plane perpendicular to the column. If there are a sufficient number of elements in the column, each with a corresponding phase shifter, all having input terminals parallelly coupled, the additive phase error tends to cancel, thus providing the nominal phase value for an element in the plane of the beam. Such a configuration does not require phase error compensation after each phase shifter. Compensation is only required for errors occurring in the network preceding the phase shifter. This may be accomplished, as shown in FIG. 4, by positioning directional couplers 61 such as directional coupler 61*b*, between the distribution network 11 and the parallelly coupled input terminals of phase shifters 62, as for example, the parallely coupled input terminals of phase shifters 62*b* coupled to the directional coupler 61*b*, instead of a directional coupler between the output terminal of each phase shifter and the corresponding element. (In FIG. 4, previously discussed elements retain the initially assigned reference numerals). The sampled signal from directional coupler 61*b* is coupled to phase detector 31, wherefrom a signal representative of the phase difference between the sampled signal from directional coupler 61*b* and the sampled input signal from directional coupler 17 is coupled to processor 32, whereafter the system operates as previously described.

Figure 5:
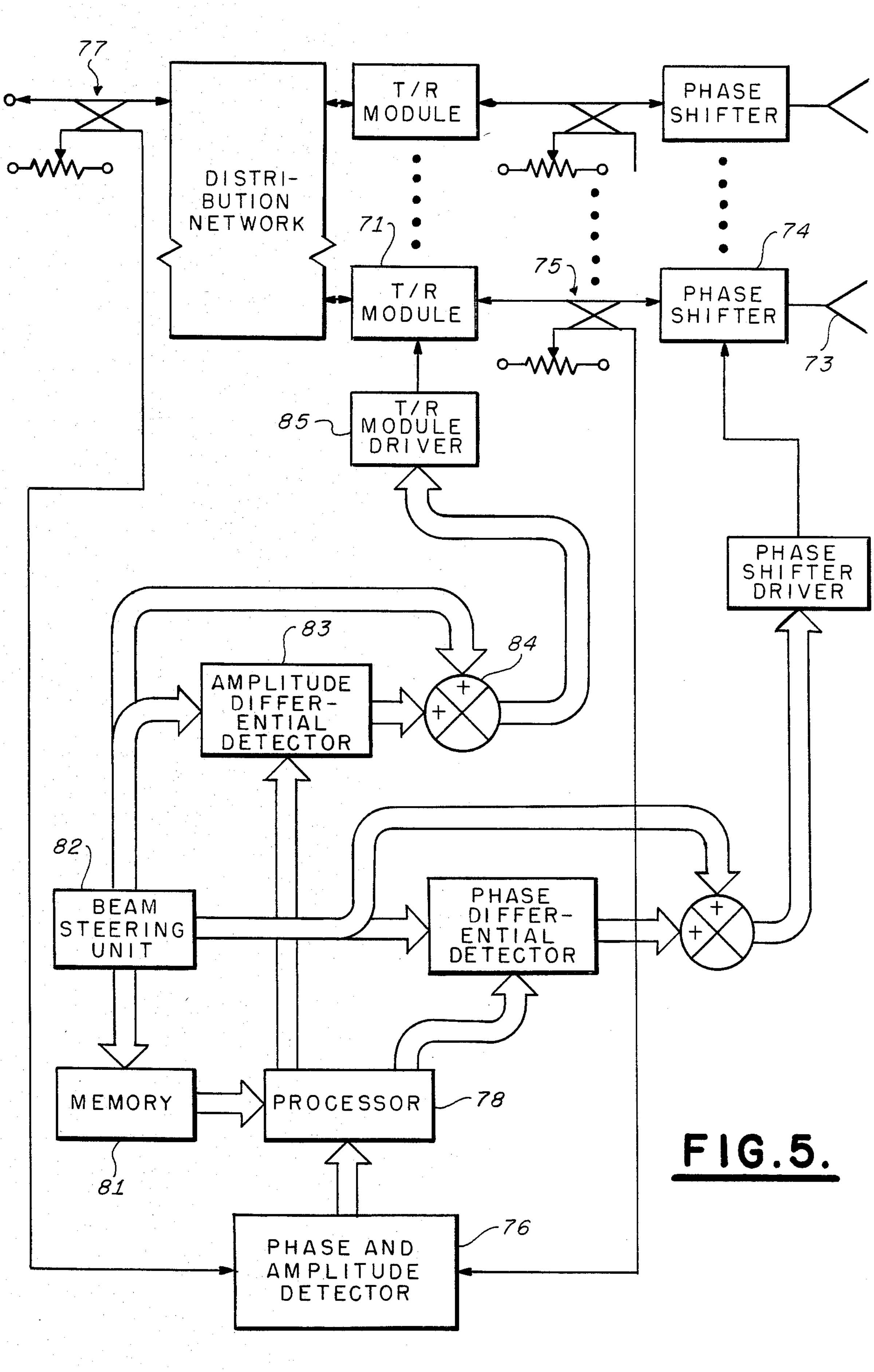
FIG. 5 is a block diagram of an embodiment of the invention wherein both amplitude and phase compensation are provided.

Utilization of six port detector can provide amplitude error control, in addition to the phase error control above described with a minimum of additional components. Referring to FIG. 5, a transmit/receive (T/R) module 71 well known in the art, may be coupled in the transmission line between the distribution network 72 and antenna element 73. The coupling shown in FIG. 5 is between the distribution network 72 and the phase shifter 74, though it may also be between the phase shifter 74 and the antenna element 73, provided that the output directional coupler 75 is positioned between the T/R module 71 and the antenna element.

Sampled signals from the output directional coupler 75 and the input directional coupler 77 are coupled to the six port detector which provides four detected signals in response to these signals, as discussed previously. The four detected signals are coupled to the processor 78, which receives calibrated coefficients from the memory 81 in accordance with signal characteristic information provided thereto from the beam steering unit 82. Processor 78, in addition to providing a signal representative of the phase angle difference between the two sampled signals, as previously discussed, provides a signal representative of the sampled signals amplitude ratio with the utilization of the equation:

$$\frac{P_{out}}{P_{in}} = \frac{|a_2|^2}{|a_1|^2} = \frac{\sum_{j=1}^{4} C_{4j} P_{j+2}}{\sum_{j=1}^{4} C_{1j} P_{j+2}}$$

Digitally coded amplitude comparison output signals from the processor 78 are coupled to an amplitude differential detector 83 wherein a comparison is made with a digital amplitude commmand signal from the beam steering unit 82. The difference between the two amplitude representative signals is added to the amplitude command signal in a summation unit 84, wherefrom the sum signal is coupled to T/R module driver 85, which in response thereto couples an amplitude control signal to the T/R module 71, thereby setting the gain of the amplifiers therein.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A method of shifting the phase of an input signal through a predetermined phase angle which comprises:

coupling a signal representative of said input signal and a signal representative of said input signal after a phase shift has been applied thereto to a phase detector for establishing signals representative of phase differences therebetween;

coupling said phase difference representative signals to a processor for processing;

selecting desired calibration data from a memory unit;

applying said selected calibration data to said processor; and utilizing said selected calibration data in processing said phase difference representative signals to establish phase comparator signals;

providing phase shift command signals to said shifter means corresponding to desired phase shifts for said input signal;

comparing said phase shift command signals with said phase comparator signals to establish phase control error signals;

combining said phase control error signals with said phase shift command signals to establish said phase control signals; and coupling said control signals to said phase control terminals of said variable phase shifter.

2. An apparatus for controlling the phase shift of a variable phase shifter comprising:

phase detector means coupled to receive a signal representative of an input signal and a signal representative of said input signal after a phase shift has been applied thereto for providing signals representative of phase differences therebetween;

memory means having calibration data stored therein that are functions of signal characteristics for providing said calibration data when addressed by signals representative of signal characteristics of said input signal;

processor means coupled to receive said phase difference representative signals and said calibration data for processing said phase difference representative signal with a utilization of said calibration data to provide phase comparator signals;

differential detector means coupled to receive said phase difference representative signals and phase shift command signals for providing error signals representative of differences therebetween;

sum means coupled to receive said error signals and said phase shift command signals for providing a signal representative of the sum thereof; and means for coupling said sum signals to said variable phase shifter, whereby said phase shifter is driven to provide a phase shift to said input signal in accordance with said sum signal.

3. An antenna of the type having a plurality of antenna elements each coupled to output terminals of a variable phase shifter having input terminals coupled to a a distribution network, each variable phase shifter having means to receive phase shift commands, comprising:

first sampling means for sampling signals coupled to input terminals of said distribution network, thereby providing first sampled signals;

second sampling means coupled between said distribution network and said antenna elements for sampling signals coupled to input terminals of said antenna elements, thereby providing second sampled signals;

comparator means coupled to receive said first and second sampled signals for providing phase difference command signals representative of phase differences therebetween;

differential detector means coupled to receive said phase difference command signals and phase shift command signals for providing error signals representative of differences therebetween;

first sum means coupled to receive said error signals and said phase shift command signals for providing sum signals representative of sums thereof; and means responsive to said sum signals for providing phase shift control signals to said variable phase shifters in accordance therewith.

4. An antenna in accordance with claim 3 wherein said comparator means includes:

detector means for providing signals representative of phase differences between said first and second representative signals;

memory means for providing calibration data contained in cells addressed by signals representative of signal characteristics of said first signal; and processor means coupled to said phase detector means and to receive said calibration data for processing said phase difference signals utilizing said calibration data to provide said phase difference command signals.

5. An antenna in accordance with claim 3 wherein said comparator means additionally provides amplitude ratio command signals in response to relative amplitudes of said first and second sampled signals and further including:

amplitude control means coupled between said distribution network and said second sampling means for controlling amplitudes of signals coupled to said antenna elements, said amplitude control means having means for receiving amplitude control signals;

amplitude differential detector means coupled to receive said amplitude ratio command signals and amplitude command signals for providing amplitude command error signals representative of differences therebetween;

second sum means coupled to receive said amplitude command signals and said amplitude command error signals for providing amplitude sum representative signals; and means responsive to said amplitude sum representative signals for providing said amplitude control signals to said amplitude control means.

6. An antenna in accordance with claim 4 wherein said detector means additionally provides signals representative of amplitude ratios of said first and second sampled signals coupled thereto, said processor means additionally processes said ratio representative signals utilizing said calibration data to provide ratio command signals, and further including:

an amplitude control means coupled between said distribution network and said second sampling means for controlling signal amplitudes coupled to said antenna elements, said amplitude control means having means for receiving amplitude control signals;

amplitude differential detector means coupled to receive said ratio command signals and amplitude command signals for providing amplitude command error signals representative of differences therebetween;

second sum means coupled to receive said amplitude command signals and amplitude error signals for providing amplitude sum representative signals; and means responsive to said amplitude sum representative signals for providing amplitude control signals to said amplitude control means.

* * * * *